(12) United States Patent
Pechanek et al.

(10) Patent No.: US 8,069,337 B2
(45) Date of Patent: Nov. 29, 2011

(54) METHODS AND APPARATUS FOR DYNAMIC INSTRUCTION CONTROLLED RECONFIGURABLE REGISTER FILE

(75) Inventors: Gerald George Pechanek, Cary, NC (US); Edward A. Wolff, Stockton, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/103,484

(22) Filed: May 9, 2011

(65) Prior Publication Data

US 2011/0213952 A1    Sep. 1, 2011

Related U.S. Application Data

(63) Continuation of application No. 12/132,001, filed on Jun. 3, 2008, now Pat. No. 7,941,648, which is a continuation of application No. 10/890,625, filed on Jul. 14, 2004, now Pat. No. 7,398,347.

(51) Int. Cl.
*G06F 7/00* (2006.01)

(52) U.S. Cl. .... 712/220; 712/203; 712/215; 712/E9.023

(58) Field of Classification Search ............. 712/220, 712/210
See application file for complete search history.

(56) References Cited

U.S. PATENT DOCUMENTS 6,550,000 B1 *   4/2003   Minematsu et al. .......... 712/215
2002/0129188 A1 * 9/2002   Fleck et al. ................... 710/316

* cited by examiner

*Primary Examiner* — Kevin Ellis
*Assistant Examiner* — Hamdy Ahmed
(74) *Attorney, Agent, or Firm* — Priest & Goldstein, PLLC

(57) ABSTRACT

A scalable reconfigurable register file (SRRF) containing multiple register files, read and write multiplexer complexes, and a control unit operating in response to instructions is described. Multiple address configurations of the register files are supported by each instruction and different configurations are operable simultaneously during a single instruction execution. For example, with separate files of the size 32×32 supported configurations of 128×32 bit s, 64×64 bit s and 32×128 bit s can be in operation each cycle. Single width, double width, quad width operands are optimally supported without increasing the register file size and without increasing the number of register file read or write ports.

20 Claims, 17 Drawing Sheets

DATA TYPES

| 32-BIT (402) | 64-BIT (404) | 128-BIT (406) | |
|---|---|---|---|
| 4B | 8B | 16B | — 408 |
| 2H | 4H | 8H | — 410 |
| 1W | 2W | 4W | — 412 |
| - | 1D | 2D | — 414 |
| - | - | 1Q | — 416 |

4-BIT DATA TYPE INSTRUCTION ENCODING

| 32-BIT (452) | 64-BIT (454) | 128-BIT (456) | |
|---|---|---|---|
| b3 b2 b1 b0 | b3 b2 b1 b0 | b3 b2 b1 b0 | |
| 0000 | 0100 | 1000 | |
| 0001 | 0101 | 1001 | |
| 0010 | 0110 | 1010 | |
| - | 0111 | 1011 | |
| - | - | 1111 | — 458 |

FIG. 5D

| 31 30 29 28 27 26 | 25 24 23 22 21 20 19 | 18 17 16 15 14 13 12 | 11 10 9 8 7 6 5 | 4 | 3 | 2 | 1 | 0 |
|---|---|---|---|---|---|---|---|---|
| OPCODE | Rt | Rx | Ry | | DTYPE 1 | | | |
| | 0 | 0 | 0 | CE1 | | DTYPE 2 | | |
| | 0 | 0 | 0 | | | | DTYPE 3 | |
| | 552 | 554 | 556 | | 558 | | | |

| 31 | 30 29 28 27 26 25 | 24 23 22 21 20 19 | 18 17 16 15 14 13 | 12 11 10 9 8 7 | 6 5 4 | 3 | 2 | 1 | 0 |
|---|---|---|---|---|---|---|---|---|---|
| S/P | OPCODE | Rt | Rx | Ry | | DTYPE 1 | | | |
| | | Rte⁰ 0 | Rxe⁰ 0 | Rye⁰ 0 | CE3 | | DTYPE 2 | | |
| | | 0 | 0 | 0 | | | | DTYPE 3 | |
| | | 572 | 574 | 576 | | 578 | | | |

MPYXA- MULTIPLY WITH EXTENDED ACCUMULATE (AS LOADED IN A VIM SLOT)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| S/P | OPCODE | | | | | | | $Rt^{00}$ | | | | 0 | 0 | $Rxe^0$ | | | | 0 | $Rye^0$ | | | | | 0 | 0 | CE2 | | MPACK | | | |

FIG. 7B

2W AND 4H SYNTAX/OPERATION

| INSTRUCTION | OPERANDS | OPERATION | ACF |
|---|---|---|---|
| | | DUAL WORD | |
| MPYXA.[SP]M.2[SU]W | $Rt^{00}, Rxe^0, Rye^0$ | XPR.Hb\|\|$Rt^{00}$.D1←XPR.Hb\|\|$Rt^{00}$.D1+$Rxe^0$.W1*$Rye^0$.W1<br>XPR.Ha\|\|$Rt^{00}$.D0←XPR.Ha\|\|$Rt^{00}$.D0+$Rxe^0$.W0*$Rye^0$.W0 | NONE |
| [TF].MPYXA.[SP]M.2[SU]W | $Rt^{00}, Rxe^0, Rye^0$ | DO OPERATION ONLY IF T/F CONDITION IS SATISFIED IN ACFs | NONE |
| | | QUAD HALFWORD | |
| MPYXA.[SP]M.4[SU]H | $Rt^{00}, Rxe^0, Rye^0$ | XPR.Bd\|\|$Rt^{00}$.W3←XPR.Bd\|\|$Rt^{00}$.W3+$Rxe^0$.H3*$Rye^0$.H3<br>XPR.Bc\|\|$Rt^{00}$.W2←XPR.Bc\|\|$Rt^{00}$.W2+$Rxe^0$.H2*$Rye^0$.H2<br>XPR.Bb\|\|$Rt^{00}$.W1←XPR.Bb\|\|$Rt^{00}$.W1+$Rxe^0$.H1*$Rye^0$.H1<br>XPR.Ba\|\|$Rt^{00}$.W0←XPR.Ba\|\|$Rt^{00}$.W0+$Rxe^0$.H0*$Rye^0$.H0 | NONE |
| [TF].MPYXA.[SP]M.4[SU]H | $Rt^{00}, Rxe^0, Rye^0$ | DO OPERATION ONLY IF T/F CONDITION IS SATISFIED IN ACFs | NONE |

FIG. 7C

DOUBLE-WORD ADDRESSING — 715

| R63 | R62 | 31 |
|---|---|---|
| ⋮ | ⋮ | ⋮ |
| R5 | R4 | 2 |
| R3 | R2 | 1 |
| R1 | R0 | 0 |

FIG. 7D

QUAD-WORD ADDRESSING — 720

| R63 | R62 | R61 | R60 | 15 |
|---|---|---|---|---|
| ⋮ | ⋮ | ⋮ | ⋮ | ⋮ |
| R7 | R6 | R5 | R4 | 1 |
| R3 | R2 | R1 | R0 | 0 |

740 / 730 / 738 / 728 / 736 / 726 / 734 / 724

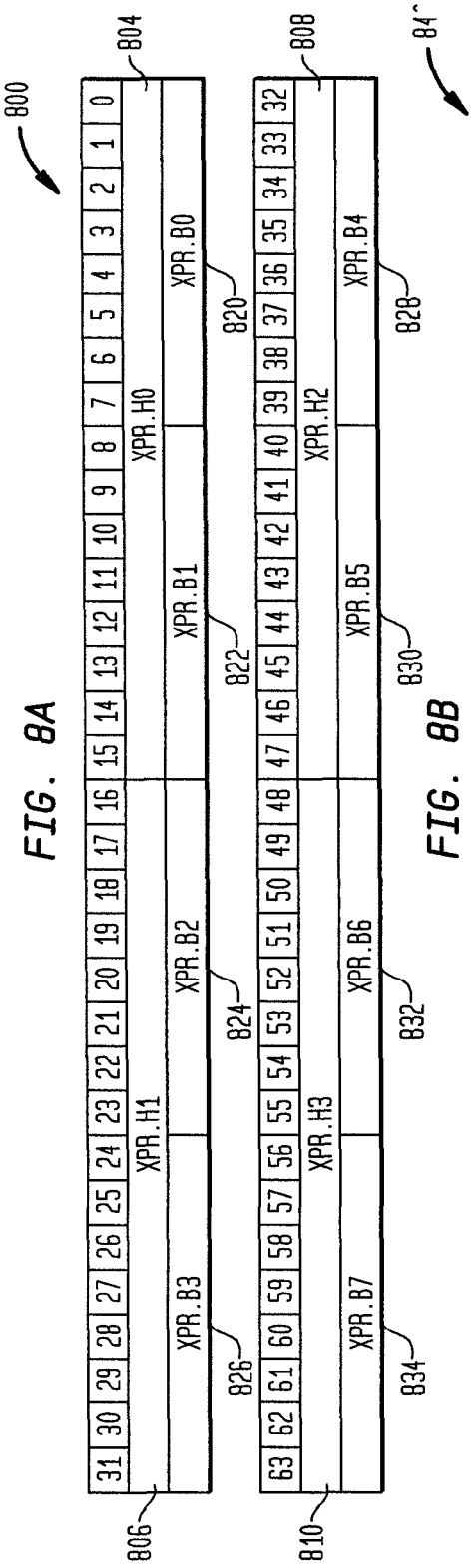
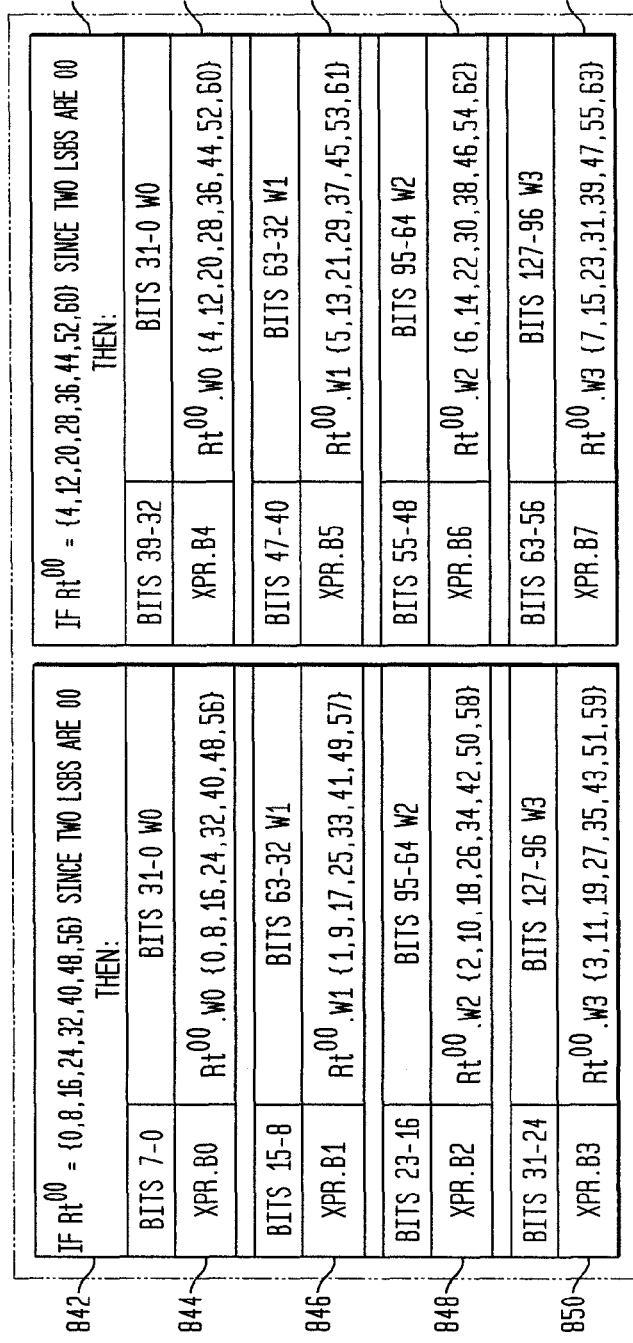
FIG. 8A
FIG. 8B

IF $Rt^{00}$ = {0,8,16,24,32,40,48,56} SINCE TWO LSBS ARE 00 THEN:

| BITS 15-0 |
|---|
| XPR.H0 $Rt^{00}$.D0 {WORD PAIRS (0,1),(8,9),(16,17),(24,25),(32,33),(40,41),(48,49),(56,57)} |
| BITS 31-16 |
| XPR.H1 $Rt^{00}$.D1 {WORD PAIRS (2,3),(10,11),(18,19),(26,27),(34,35),(42,43),(50,51),(58,59)} |

882 —

IF $Rt^{00}$ = {4,12,20,28,36,44,52,60} SINCE TWO LSBS ARE 00 THEN:

| BITS 63-0 |
|---|
| XPR.H2 $Rt^{00}$.D0 {WORD PAIRS (4,5),(12,13),(20,21),(28,29),(36,37),(44,45),(52,53),(60,61)} |
| BITS 127-64 |
| XPR.H3 $Rt^{00}$.D1 {WORD PAIRS (6,7),(14,15),(22,23),(30,31),(38,39),(46,47),(54,55),(62,63)} |

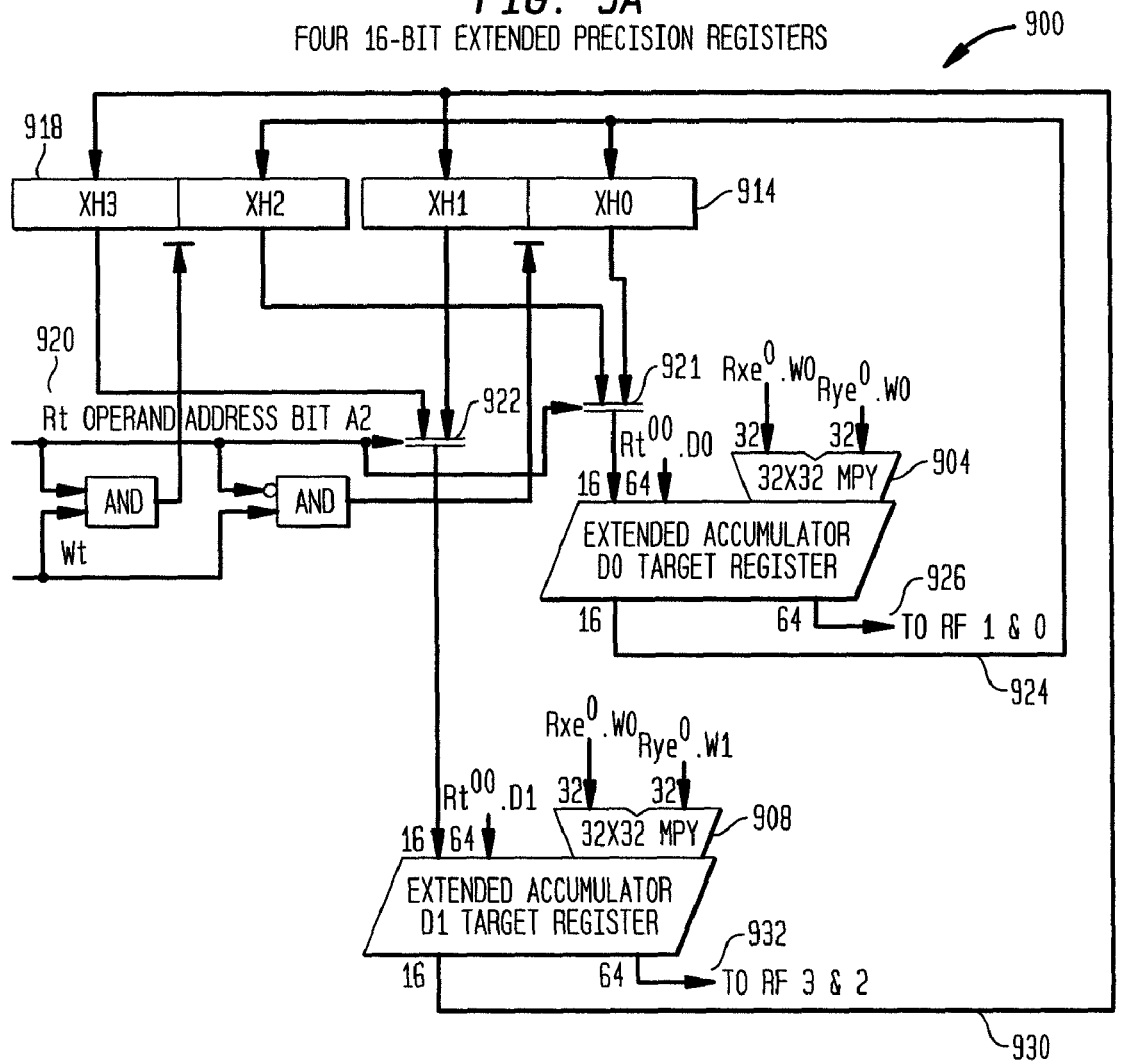

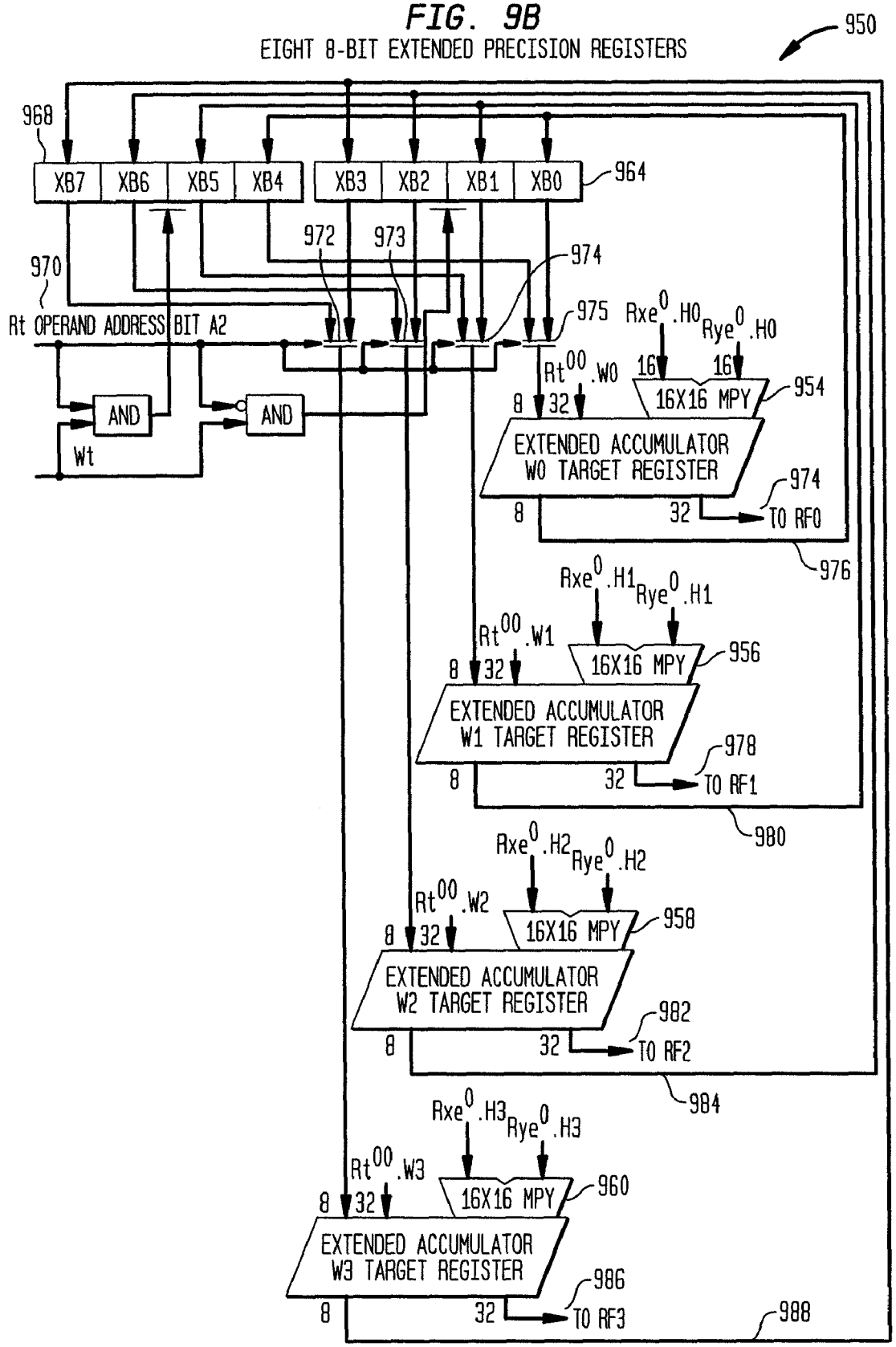

METHODS AND APPARATUS FOR DYNAMIC INSTRUCTION CONTROLLED RECONFIGURABLE REGISTER FILE

RELATED APPLICATIONS

The present application is a continuation of and claims the benefit of and priority to U.S. Ser. No. 12/132,001 filed Jun. 3, 2008 which is a continuation of U.S. Ser. No. 10/890,625 filed Jul. 14, 2004 all of which are incorporated herein by reference in their entirety.

FIELD OF THE INVENTION

The present invention relates generally to improvements to processor architectures, and more particularly to advantageous techniques for providing a scalable building block register file which supports multiple register file configurations, including support for extended precision operations, where the configurations are dynamically changeable based on an instruction and its data type specification thereby allowing the programmer's view of the register file to change instruction-by-instruction.

BACKGROUND OF THE INVENTION

In prior systems, a processor was typically required to support a restricted set of data types in the execution units and storage units that supplied the execution units with data. The restriction of the data types represented a compromise between an application's real needs, performance requirements, and implementation costs. If requirements for a processor dictated more optimal support for both single width and packed data type operations, there arose a number of problems that had to be resolved in the design and implementation of the processor.

One approach to using a single register file design to support both single width and packed data types employs multiple read and write ports, where each port is of the lowest data type granularity required for single width accesses. For example, consider a processor required to support a 32 bit operand single width access and a dual 32 bit packed data access from a local storage unit, such as a register file. In this example, each register file access port is fixed to support 32 bit accesses, thereby optimizing operations for single width accesses. In order to support the reading of two 32 bit packed data elements in a single execution unit, two 32 bit data read ports are implemented in the single register file. This approach leads to increased complexity. For example, in a typical execution operation, such as a dual 32 bit packed data add operation in an arithmetic logic unit (ALU) requiring two source operands and one target operand, four read ports would be required in the register file to meet the source operand requirement and two write ports would be required for the target operand. Thus, a total of six 32 bit access ports would be required for this example.

The implementation of multiple read and write ports grows in complexity when considering (VLIW) architectures. In a VLIW processor using a single register file design to support multiple execution units, the access requirement for the single register file grows by multiples according to the number of instructions in the VLIW. For example, with three execution units, similar to the previously described ALU, each with four read and two write ports, the single register file would be required to support twelve read ports and six write ports. A total of eighteen access ports would be needed. The total number of access ports increases when considering possible load and store ports which may be required for independent operation. Placing these additional access ports in a single register file increases the complexity and implementation costs of the register file design and can severely affect the register file's performance, and thereby limit the overall processor performance.

Attempting to resolve such complexity and performance problems by supporting only the larger packed data types of the architecture in the register file and supporting smaller data type accesses external to the register file, leads to inefficient use of the register file and potential increases in power, due to the inefficiency. For example, with a register file having only 64 bit read access ports, the ability to support dual 32 bit packed data accesses is easily accomplished, but the support for single width 32 bit accesses becomes complicated. A single width 32 bit access can be accomplished external to the register file but at the expense of always reading 64 bit s when only single 32 bit s width accesses are required. For single 32 bit accesses, only 32 bit s of the 64 bit s accessed are used with the consequent increase in power associated with the unused access.

When executing algorithms, it is desirable to have a storage file that can be organized to more advantageously support processing of the varying data types and formats that dynamically occur in a programming application. For example, a register file of large width for high precision operations can be required in one part of an application while single and multiple parallel operations on lower precision data can be required in a different part of the same application. Flexibly satisfying these diverse data type requirements may result in high hardware costs, such as those typically associated with implementing a wider register file and additional read and write ports. The general problem concerns the optimization of a programmer's storage facility, such as a register file, for use in accessing diverse data types in a manner that dynamically is usable without setup overhead, improves processor performance, is cost efficient to implement, and is scalable.

SUMMARY OF THE INVENTION

The present invention advantageously addresses problems, such as those described above, while achieving a variety of advantages as addressed in further detail below. An aspect of the present invention includes a scalable register file having multiple configurations. The scalable register file can be achieved by combining register files and using selection logic and multiplexer complexes that respond to instruction types and data types as specified in the instruction. The instruction types and data types are defined in a scalable manner in the instruction set architecture which provides support for multiple register file configurations of extended capacity. In general, a reconfigurable register file is built by using a number of register the building blocks that are appropriately sized in capacity, depth by width organization, and number of read and write ports to meet the requirements of a system. By appropriate multiplexing and control logic utilizing the instruction architecture, single width data, double width data, quadruple width data, octal width data, and the like are made available. In general, a scalable number of multiple width and depth-by-width configurations are provided depending upon an instruction type and its data type specification. The width of data access is defined by an instruction and its data type, where the smallest access width is based upon the building block register file further allowing accesses and register file configurations to be scalable with the architecture definition.

These and other features, aspects and advantages of the invention will be apparent to those skilled in the art from the following detailed description taken together with the accompanying drawings.

BRIEF DESCRIPTION OF THE DRAWINGS

FIG. 4A illustrates an example of data types that might be supported in a system using an SRRF such as illustrated in FIG. 2A in accordance with the present invention;

FIG. 4B illustrates an example encoding of data types for use in instruction formats to specify the data type operation desired in accordance with the present invention;

FIG. 5D illustrates an example of an instruction format that uses 7 bit operand addresses in accordance with the present invention;

FIG. 5E illustrates an example of an instruction format that uses 6 bit operand addresses in accordance with the present invention;

FIG. 7A illustrates an example of an MPYXA instruction with 6 bit register operand fields and a four bit data type field (MPack) in accordance with the present invention;

FIG. 7B illustrates the 2W and 4H Syntax/Operation for the MPYXA instruction of FIG. 7A in accordance with the present invention;

FIG. 7C illustrates a 32×64 bit doubleword addressing configuration of an SRRF as illustrated in FIG. 2B with M=16 and N=32 in accordance with the present invention;

FIG. 7D illustrations a 16×128 bit quadword addressing configuration of an SRRF as illustrated in FIG. 2B with M=16 and N=32 in accordance with the present invention;

FIG. 8A illustrates the extended precision register XPR with four halfwords and eight bytes in accordance with the present invention;

FIG. 8B illustrates the relationship between the specified target register and the choice of the byte XPR with 4H operation register usage tables in accordance with the present invention;

FIG. 8C illustrates the relationship between the specified target register and the choice of the halfword XPR with 2W operation register usage tables in accordance with the present invention;

FIG. 9A illustrates four extended precision halfwords stored in two registers and used with the SRRF of FIG. 2A in accordance with the present invention; and FIG. 9B illustrates eight extended precision bytes stored in two registers and used with the SRRF of FIG. 2A in accordance with the present invention.

DETAILED DESCRIPTION

Figure 1:
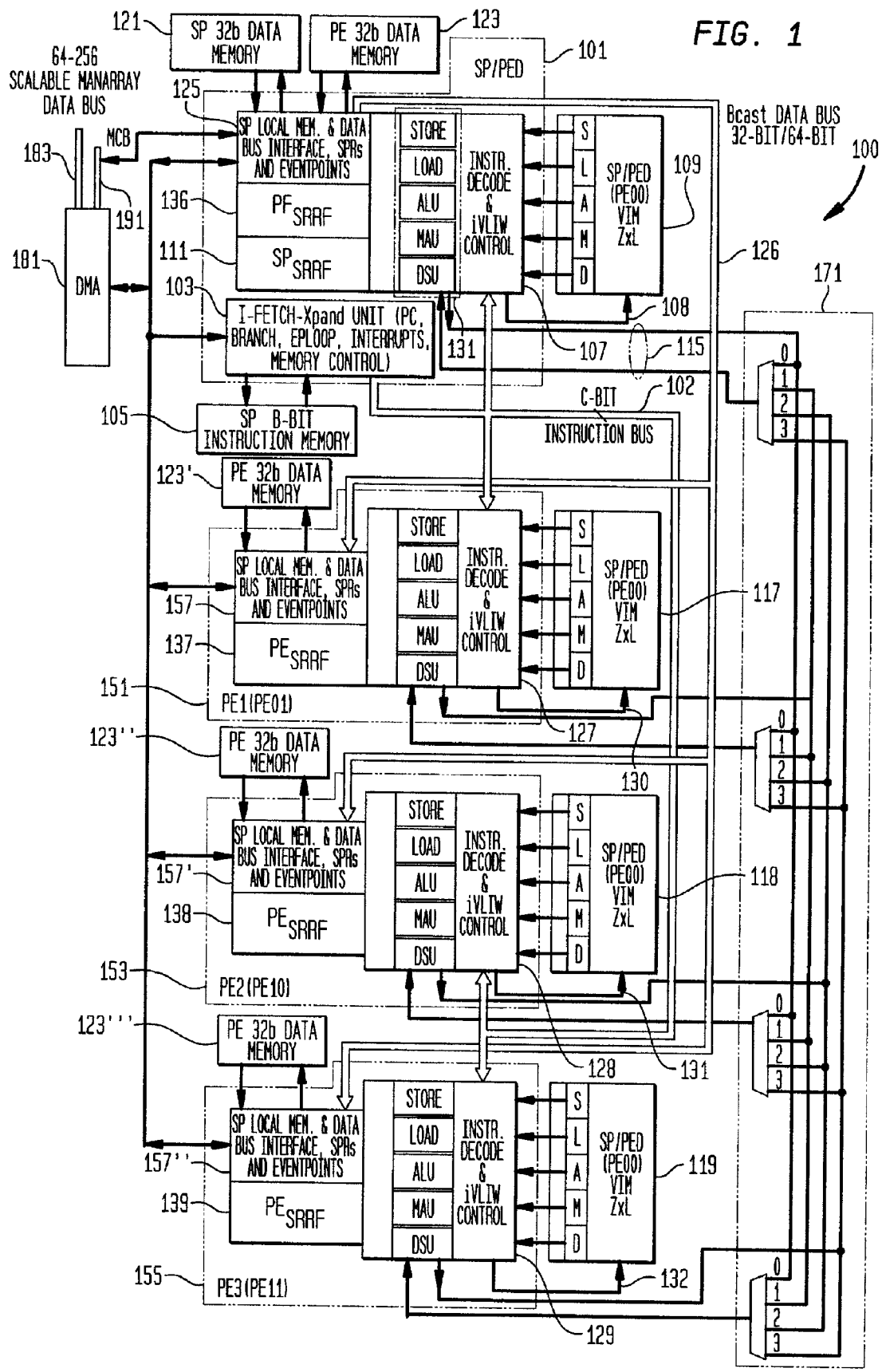
FIG. 1 illustrates a 2×2 iVLIW deferred execution processor (DXP) including a Z×L very long instruction word memory (VIM) to support a scaleable reconfigurable register file (SRRF) in accordance with the present invention.

One aspect of the present invention addresses a general form of a modified indirect execution architecture to resolve scalabilty and extendibility problems in a processor design. In a presently preferred embodiment of the present invention, an exemplary 2×2 iVLIW deferred execution processor (DXP) 100 uses single instruction multiple data stream (SIMD) controlling techniques shown in FIG. 1. A DXP is described in further detail in United States Application Ser. No. 10/773, 673 entitled "METHODS AND APPARATUS FOR GENERAL DEFERRED EXECUTION PROCESSORS" filed on Feb. 6, 2004 which is incorporated by reference herein in its entirety. While an exemplary load/store register file based array VLIW processor, also referenced as the SLAMDunk1 processor or Deferred eXecution Processor (DXP1), is described in detail below to demonstrate the basics of the scalable reconfigurable register files and data memories, it will be recognized that the approach described herein is more generally applicable to scalar with superscalar implementations, array, vector, multi-thread, and very long instruction word (VLIW) processor designs with the addition of appropriate instructions consistent with the teachings herein.

The 2×2 iVLIW DXP 100 comprises a sequence processor (SP) controller combined with a processing element-0 (PE0) SP/PE0 101. Three additional PEs 151, 153, and 155, are also utilized to demonstrate a number of general extensions to the indirect VLIW architecture for use with scalable reconfigurable register files (SRRFs) in accordance with the present invention. It is noted that PEs can also be labeled with their matrix positions as shown in parentheses for PE0 (PE00) 101, PE1(PE01) 151, PE2 (PE10) 153, and PE3 (PE11) 155. The SP/PE0 101 contains a fetch controller 103 to allow the fetching of short instruction words (SIWs) from a B=32 bit instruction memory 105. The fetch controller 103 provides the typical functions needed in a programmable processor such as a program counter (PC), branch capability, event point (EP)

loop operations, and support for interrupts. It also provides the program instruction memory control which could include an instruction cache if needed by an application. In addition, the fetch controller 103 dispatches 32 bit SIWs to the other PEs in the system by means of the C=32 bit instruction bus 102.

In this exemplary system, common elements are used throughout to simplify the explanation, though actual implementations are not limited to the elements shown. For example, the execution units 131 in the combined SP/PE0 101 can be separated into a set of execution units optimized for the control function, for example, fixed point execution units, and the PE0, as well as the other PEs, can be optimized for a floating point application. For the purposes of this description, it is assumed that the execution units 131 are of the same type in the SP/PE0 and the other PEs. In a similar manner, SP/PE0 and the other PEs use a five instruction slot iVLIW architecture which contains an Z×L bit very long instruction word memory (VIM) 109, 117, 118, and 119 and an instruction decode and VIM controller function unit 107, 127, 128, and 129, respectively. The VIM controller function units 107, 127, 128, and 129 receive instructions, such as execute VLIW (XV) instructions, as dispatched from the SP/PE0's fetch controller 103 and generates the VIM addresses and control signals 108, 130, 131, and 132 required to access the iVLIWs stored in VIM. Referenced instruction types are identified by the letters SLAMD, for example in VIM 109, where the letters are matched up with instruction types as follows: Store (S), Load (L), ALU (A), MAU (M), and DSU (D). The basic concept of loading of the iVLIWs is described in greater detail in U.S. application Ser. No. 10/773,673 entitled "METHODS AND APPARATUS FOR GENERAL DEFERRED EXECUTION PROCESSORS" filed on Feb. 6, 2004. Also contained in the SP/PE0 and the other PEs is a common design PE scalable reconfigurable register file (SRRF) 136, 137, 138, and 139 which is described in further detail below.

Due to the combined nature of the SP/PE0, the data memory interface controller 125 must handle the data processing needs of both the SP controller, with SP data in memory 121, and PE0, with PE0 data in memory 123. The SP/PE0 controller 125 also controls the data that is sent over the 32/64 bit broadcast data bus 126. The other PEs, 151, 153, and 155 contain common physical data memory units 123', 123", and 123''' though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 various aspects of which are described in greater detail in U.S. Pat. Nos. 6,023,753, 6,167,501, and 6,167,502.

The interface to a host processor, other peripheral devices, external memory, or the like can be implemented in many ways. For completeness, a primary interface mechanism is contained in a direct memory access (DMA) control unit 181 that provides a scalable data bus 183 that connects to devices and interface units external to the DXP 100. The DMA control unit 181 provides the data flow and bus arbitration mechanisms needed for these external devices to interface to the DXP's core memories via the multiplexed bus interface symbolically represented by connection 185.

In accordance with the present invention, the instruction architecture includes a general form of indirect execute instructions supporting scalable and reconfigurable register files. In a presently preferred embodiment, the instructions which make up a VLIW do not have to be stored in executable form in the control processor's program memory, nor do they need to be stored in the program memory at all. If these instructions are not stored in the program memory, then they can be stored in data memory and can be loaded into the VLIW storage by DMA or alternate loading facilities, such as the use of load instructions. Also, the instructions which make up a VLIW do not have to be executable singly as a program memory issued instruction. This instruction architecture decouples the instructions that are stored in VLIW memory from the instructions that are stored in the main program storage. This decoupling allows the instructions that make up the VLIW to not have to have the same instruction format as those instructions that are stored in program storage. Consequently, opcode fields, register file operand address fields, data type fields, and the like, are not restricted to the limited instruction format size required for those instructions stored in program memory. Further, there is no requirement that the format size of each slot instruction be identical. A VIM line can be made up of a set of instructions each of a format and length optimized for its execution unit's function. Therefore, the instruction decoupling allows provides each VIM, for example VIMs 109, 117, 118, and 119, are configured as Z locations by L bits per VIM line where both Z and L can vary depending upon the processor requirements.

The instruction decoupling further provides the enabling mechanism to generally support SRRF for scalable capacity and configurations more optimally suited to different applications. A scalable reconfigurable register file that minimizes development time and expenses can be obtained by using a specific size, capacity, and read and write port configuration register file or memory element as a building block for larger reconfigurable register files or memories. The building block storage element is chosen to support a minimum port configuration and capacity that can be used in other systems with different storage element requirements. An exemplary 32×32 4-write and 8-read register file can be used as a scalable building block. The number of access ports required is related to the number of independent operands that can be specified by the maximum number of concurrently executing instructions. For example, if a 5 instruction indirect VLIW is used requiring 3 read ports and 1 write port for the MAU, 2 read ports and 1 write port for both the ALU and DSU, a read port for the Store unit and a write port for the Load unit, then there are 12 access ports, 8 read and 4 write ports.

Figure 2A:
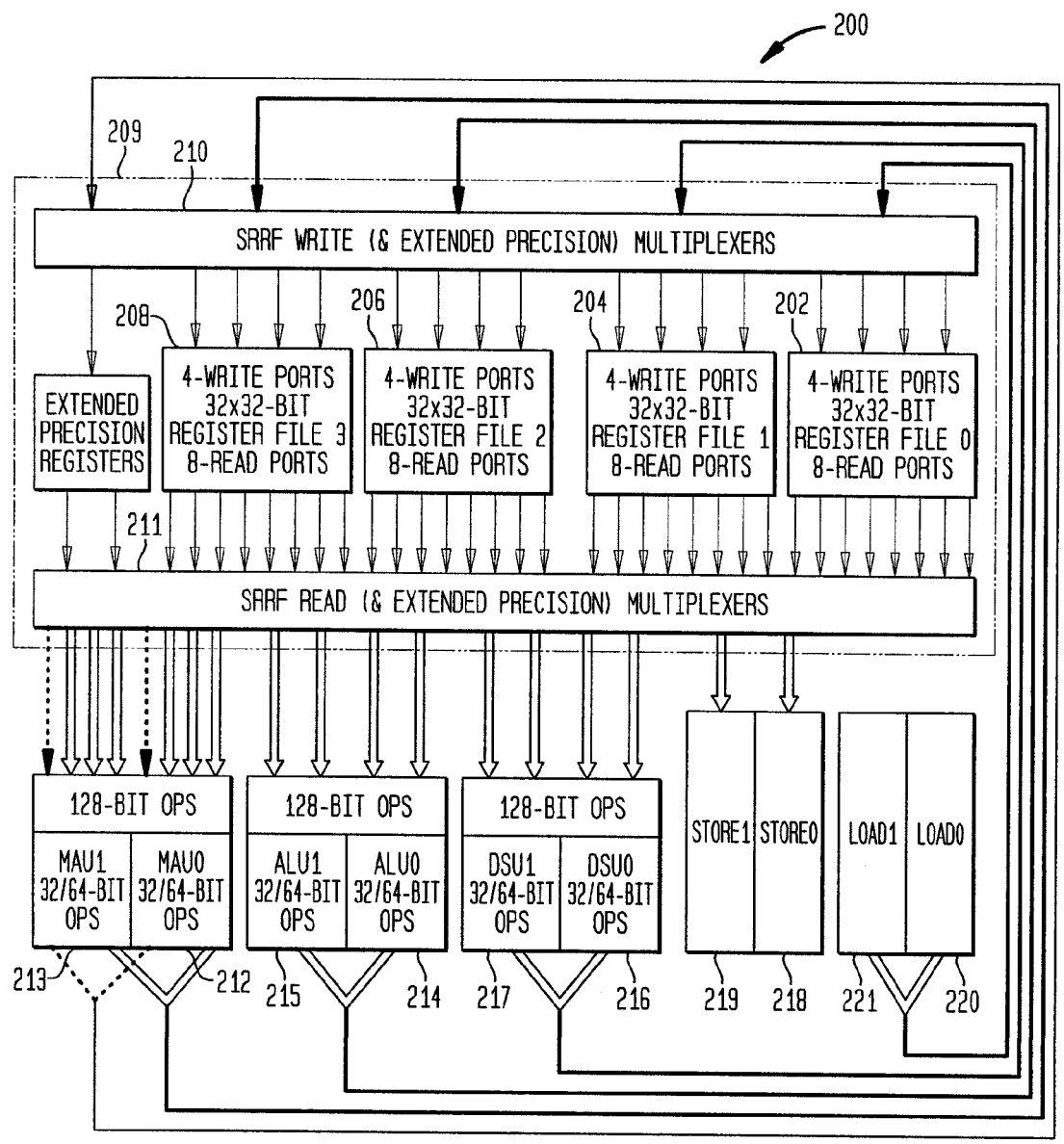
FIG. 2A illustrates a specific example of an SRRF using four building block register files in accordance with the present invention.

FIG. 2A shows a scalable reconfigurable register file (SRRF) subsystem 200 having an SRRF 209. The SRRF 209 contains four 32×32 bit 4-write and 8-read port register files 202, 204, 206 and 208. It is noted that register files have been built using memory cell technology and are typically designed for low capacity and a low number of access ports in order to achieve high performance. The present invention uses such register files in multiple configurations to minimize the number of access ports and provide larger capacity SRRFs. For example, SRRF 209 can be advantageously configured as a 128×32 bit, 64×64 bit, 32×128 bit, two 64×32 bit, two 32×64 bit, and four 32×32 bit register files where the configuration is selected by the instruction and data type in operation. For example, a combination of five instructions each specifying its own SRRF configuration, or in some cases more than one configuration for each instruction, can be in operation for each iVLIW that is executing each cycle. To take advantage of these configurations, advantageous instruction encodings are defined that specify how each of the SRRF's internal 32×32 bit register file 8-read and 4-write ports are used. The configurations are obtained through use of input write multiplexers 210 and output read multiplexers 211.

By using building block execution units, increased execution capacity can be obtained through concatenation of operations. In processor SRRF subsystem 200 of FIG. 2A, the execution units MAU0 212, ALU0 214, DSU0 216, Store 218, and Load0 220 are combined with duplicated MAU1 213, ALU1 215, DSU1 217, Store1 219, and Load1 221, respectively. This approach allows up to twice the compute capacity per cycle. For example, 64 bit operations on ALU0 214 and ALU1 215 are concatenated ALU1∥ALCM producing 128 bit operations, where ∥ indicates the concatenation of operations. The utilization of duplicating execution units coupled with appropriate instruction encodings allows the use of an advantageous set of connections, as described further below, between building block execution units and the SRRFs obtaining additional functional capability for supporting a wider diversity of data types. By way of example, FIG. 2A shows support for 128 bit operations (Ops) on the concatenated execution units MAU1∥MAU0, ALU1∥ALU0, and DSU1∥DSU0. An example of a type of connection, other than that associated with concatenation, that can be used between building block execution units is a connection between DSU shift register stages to double the length of available shift registers in each DSU0 216 and DSU1 217. It should be noted that the bus sizes shown in bus identification table 222 and throughout the data paths correlate to the maximum size of the result operands and input operands as required by the architecture and that each bus may carry data requiring less than the maximum bus size.

It is noted that smaller capacity configurations can also be chosen as subsets of the architecture based upon a system's requirements. For example, using a 16×32 bit 4-write and 8-read register file as a building block, 64×32 bit, 32×64 bit, 16×128 bit, dual 32×32 bit, dual 16×64 bit, and quad 16×32 bit register file configurations can be obtained which may be sufficient capability for smaller systems.

The reconfiguration aspects of the register file advantageously allow a programmer or compiler greater flexibility in balancing the needs of the sequential and parallel parts of a program. In addition, for a processor supporting 32×32 bit and 16×64 bit register file configurations which are subsets of the SRRF 209, compiling existing code for such processors using the larger SRRF should be relatively easy.

Figure 2B:
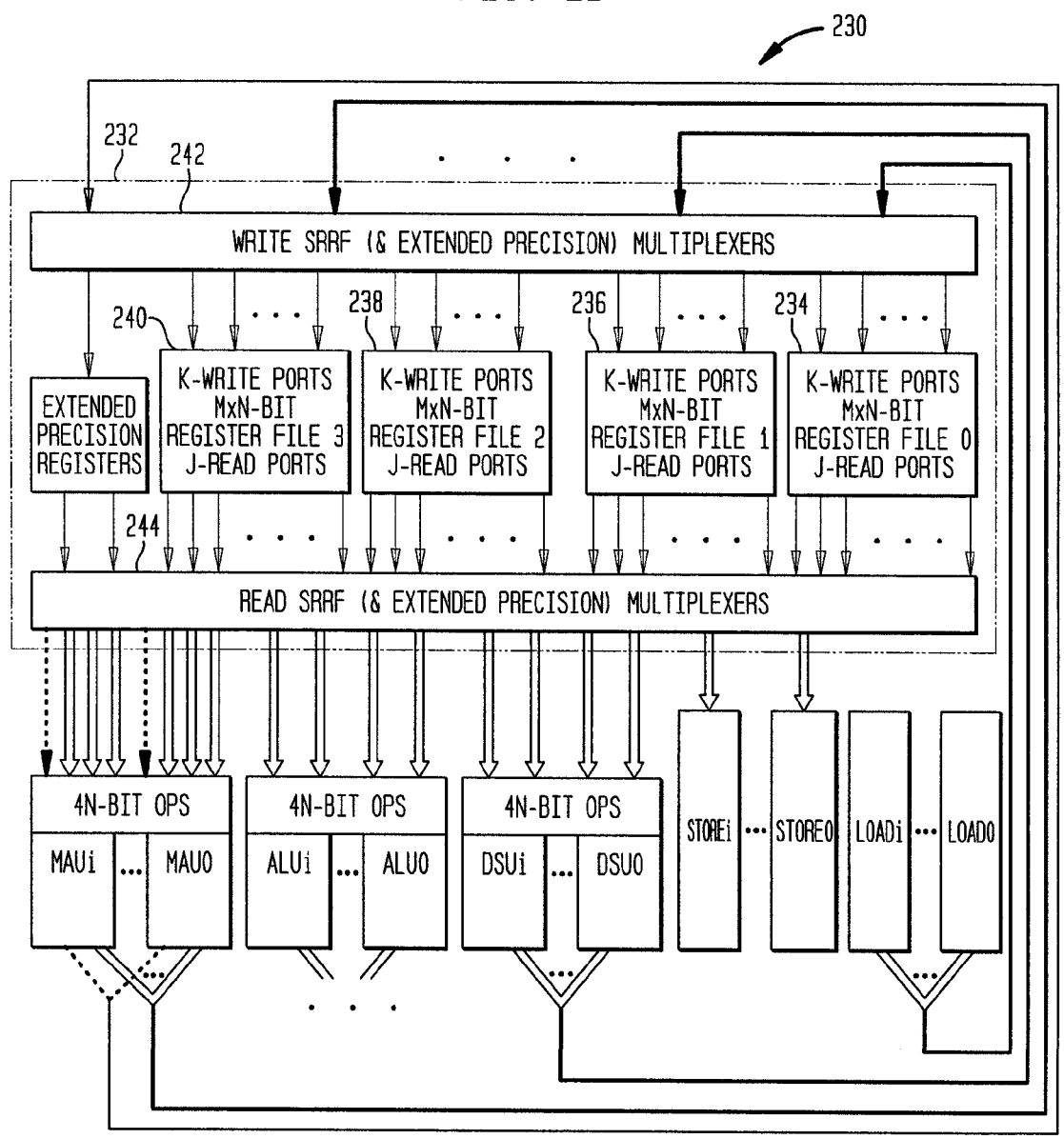
FIG. 2B illustrates an M×N general form of an SRRF using four building block files in accordance with the present invention.

FIG. 2B processor SRRF subsystem 230 illustrates an SRRF 232 in general form where the building block register files (RFs) 234, 236, 238 and 240 are M×N bit files. As discussed further below, M is the number of locations parameter and N is the data precision parameter. The four M×N bit J-read port and K-write port RFs can be configured by the write and read SRRF multiplexers 242 and 244, respectively, to produce a 4M×N bit file, a 2M×2N bit file, a M×4N bit file, a dual 2M×N bit file, a dual M×2N bit file, and a quad M×N bit file.

The number of locations parameter M is dependent upon the applications that are expected to run on the processor. While M might be relatively small for some algorithms, it might also be useful to have it relatively large for other algorithms, such as vector operations where having 64 or 128 locations is of value. Consequently, an M of 16 or 32 is reasonable for the building block RFs.

The data precision parameter N is selected based upon considerations, such as the data type precision and packed data formats required by an instruction execution operation. Consequently, N=16 or 32 is also reasonable. It is noted that other power of 2 values for M or N and non-power of 2 values for M or N are not precluded. For example, M could be 24 and N could be 18 or 20 bits, for a particular application.

The number of read ports J and write ports K of the RFs are determined consistent with the concurrency of instruction execution supported by the processor. With a processor, for example, using a five 32 bit instruction issue iVLIW and execution units defined as the MAU, ALU, DSU, Load, and Store units, as previously described above, there is need for K=4 write ports and J=8 read ports. A smaller more control oriented processor might require less ports while a larger application focused processor might require more ports. It should be noted that the term port as used herein includes both address lines and data lines.

A processor which runs multiple threads of execution could also make use of an SRRF where a thread context can be associated with an internal building block register file. By appropriate instruction set architecture definition, the multi-threaded processor can coalesce threads or expand the number of threads into accessing different register file address configurations supported by the SRRF to more optimally support an application. The execution capabilities in a multi-threaded processor with an SRRF could be provided by multiple equivalent sets of execution units with an execution unit set used in each thread. The multiple sets of execution units could be concatenated into a grouped set of execution units or a grouped set split into the smallest common units depending upon the SRRF configuration in use.

Figure 2C:
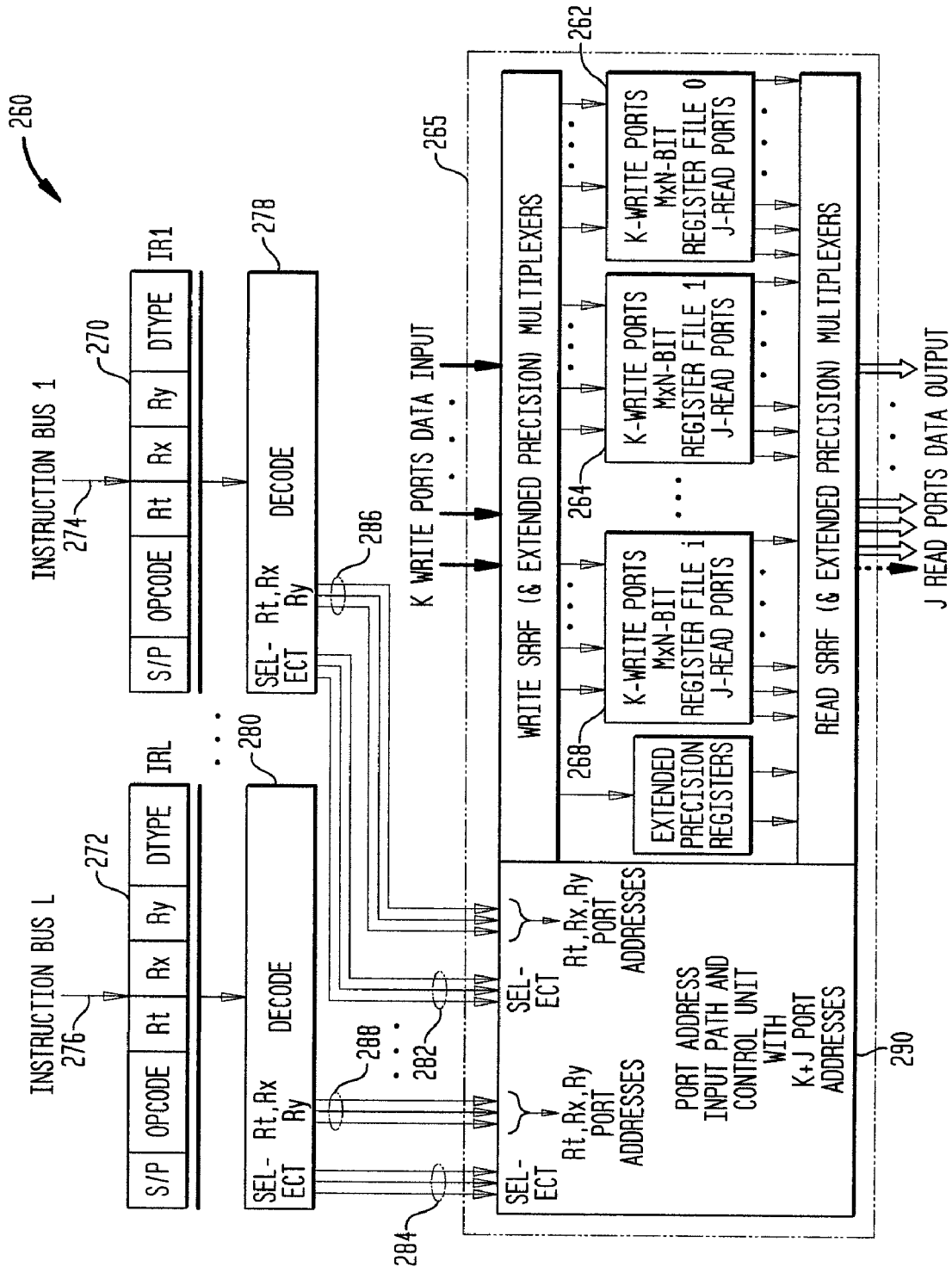
FIG. 2C illustrates an M×N general form of an SRRF using i+1 building block files in accordance with the present invention.

FIG. 2C shows an SRRF unit diagram 260. This figure generally illustrates that the number of memory or RF blocks, for example i+1 RF blocks 262, 264, and 268, can vary in an SRRF, such as SRRF 265, and further that the number of ports and their associated port addresses for selected configurations can be a subset of the combined number of RF or memory port address available internally to the SRRF. For example, if a processor system that is to use the SRRF, such as an SRRF of the type shown in FIG. 2A, is limited in its support so that it can support only three register file configurations, a 4M×N bit file, a 2M×2N bit file, and a M×4N bit file, using four RF blocks, then the SRRF 265 requires only K+J port addresses, not the 4(K+J) port addresses that are available internally to the SRRF. The control of each port, where each port is made up of a port address path and data port, is a result of decoding instructions. For example, in FIG. 2C, two instructions registers, IR1 270 and IRL 272, from a group of instruction registers, such as might occur in a VLIW processor, store fetched instructions, from instruction bus 1 274 and instruction bus L 276, respectively, in preparation for a decode pipeline stage.

During the decode pipeline stage, decode logic for each instruction, such as decode logic 278 and decode logic 280, creates multiplexer select signals 282 and 284 and passes the register file operand addresses 286 and 288 to the SRRF port address input path and control unit 290. It is noted that the read and write port address inputs on each RF block and timing control signals, such as write enables and the like, are not shown in FIGS. 2A-2C for clarity and since, for example, the timing control signals may vary depending upon the process technology chosen for implementing the RFs.

For example, for select configurations of an SRRF built with four 16×32 bit RF blocks and instruction formats using 6 bit operand addresses, the upper two bits of the 6 bit address for each port in combination with the data type and instruction opcode can be used to select the RF block or group of RF blocks that are to be enabled for reading or writing operands. The number of memories or RF blocks that are used depends upon the configuration options desired. For example, if eight memories or RF blocks are used in an SRRF design, then four configurations of interest that can be supported include an 8M×N bit file, a 4M×2N bit file, a 2M×4N bit file, and an M×8N bit file. With M=16 and N=32, the configurations of interest are 128×32 bit, 64×64 bit, 32×128 bit and 16×256 bit. If each 16×32 bit RF building block has 8 read ports and 4 write ports, then internal to the SRRF there would be 8(4+8)= 96 ports, but externally the SRRF uses a reduced number, 4+8=12, of port addresses to support these four configurations.

Figure 3A:
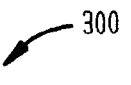
FIG. 3A illustrates a 128×32 bit word addressing configuration of an SRRF as illustrated in FIG. 2A in accordance with the present invention.

FIGS. 3A-3F illustrate logical addressing configurations as viewed by a particular instruction. FIG. 3A illustrates a 128× 32 bit word addressing configuration 300 for the SRRF 209 of FIG. 2A where there are 128 addressable locations with each location having a 32 bit depth. In these 128 addressable locations, up to 128 entries, where each entry is 32 bits, may be stored. Each SRRF port using the register file can effectively treat the four 32×32 register files 202, 204, 206, and 208 of FIG. 2A as a single register file of this addressing configuration 300.

Figure 3B:
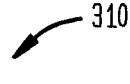
FIG. 3B illustrates a 64×64 bit doubleword addressing configuration of an SRRF as illustrated in FIG. 2A in accordance with the present invention.

FIG. 3B illustrates a 64×64 bit doubleword addressing configuration 310 for the SRRF 209 of FIG. 2A where there are 64 addressable locations with each location having a 64 bit depth. In these 64 addressable locations, up to 64 entries, where each entry is 64 bits, may be stored. Each SRRF port using the register file can effectively treat the four 32×32 register files 202, 204, 206, and 208 of FIG. 2A as a single register file of this addressing configuration 310.

Figure 3C:
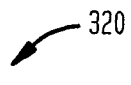
FIG. 3C illustrates a 32×128 bit quadword addressing configuration of an SRRF as illustrated in FIG. 2A in accordance with the present invention.

FIG. 3C illustrates a 32×128 bit quadword addressing configuration 320 of the SRRF 209 of FIG. 2A where there are 32 addressable locations with each location having a 128 bit depth. In these 32 addressable locations, up to 32 entries, where each entry is 128 bits, may be stored. Each SRRF port using the register file can effectively treat the four 32×32 register files 202, 204, 206, and 208 of FIG. 2A as a single register file of this addressing configuration 320.

Figure 3D:
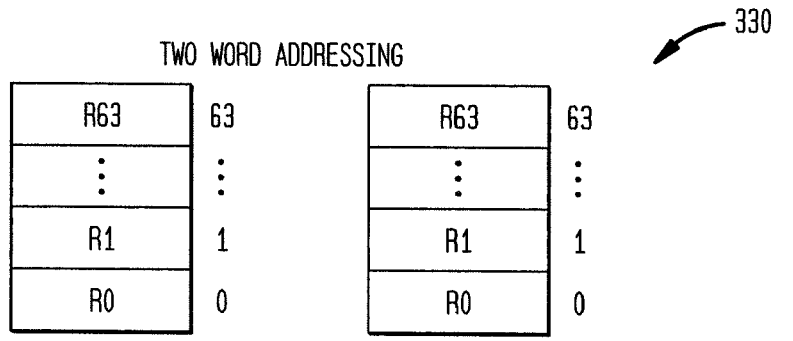
FIG. 3D illustrates a two 64×32 bit word addressing configuration of an SRRF as illustrated in FIG. 2A in accordance with the present invention.
Figure 3E:
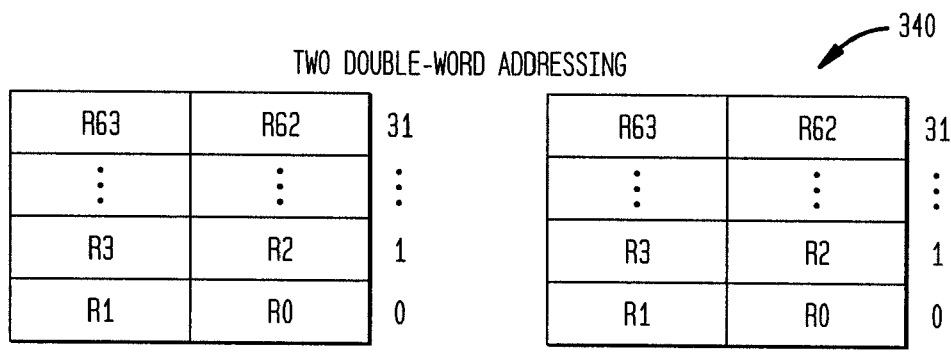
FIG. 3E illustrates a two 32×64 bit doubleword addressing configuration of an SRRF as illustrated in FIG. 2A in accordance with the present invention.
Figure 3F:
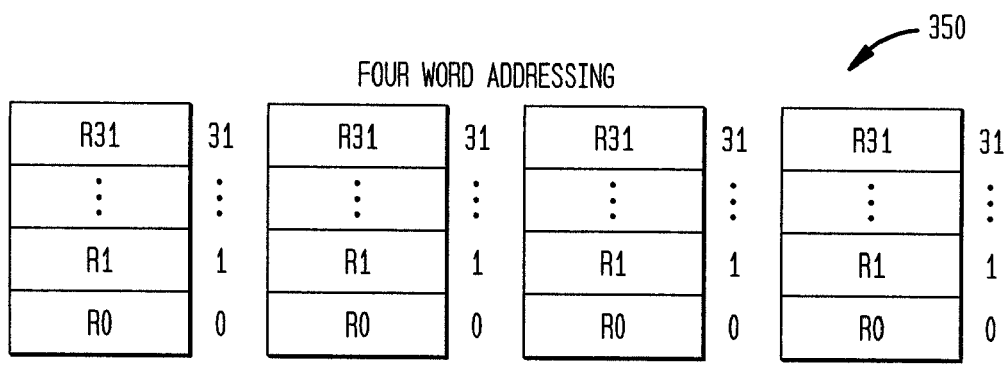
FIG. 3F illustrates a four 32×32 bit word addressing configuration of an SRRF as illustrated in FIG. 2A in accordance with the present invention.

FIG. 3D illustrates a two word 64×32 bit addressing configuration 330 of the SRRF 209 of FIG. 2A where there are two sets of 64 addressable locations with each location having a 32 bit depth. FIG. 3E illustrates a two doubleword 32×64 bit addressing configuration 340 for the SRRF 209 of FIG. 2A where there are two sets of 32 addressable locations with each location having a 64 bit depth. FIG. 3F illustrates a four word 32×32 bit addressing configuration 350 for the SRRF 209 of FIG. 2A where there are four sets of 32 addressable locations with each location having a 32 bit depth.

The addressing configurations 300, 310, and 320 of FIGS. 3A, 3B and 3C, respectively, all use a single port address per SRRF port while internally for the same port number there are four RF address ports. The choice of which RF or group of RFs that is enabled for an SRRF port access is determined by an instruction opcode, its data type field, and, in selected configurations, portions of the operand address. The addressing configurations 330 and 340 of FIGS. 3D and 3E, respectively, both use two access RF ports per SRRF port. In FIG. 3D, two RF ports are combined such that the lower 32 address locations use one internal RF while the upper 32 address locations use a second internal RF. Two RFs together provide one set of 64×32 bit locations. The other two RFs are combined in a similar way to provide a second set of 64×32 bit locations. Each set is independently accessible which would allow the addressing configuration 330 or 340 to support at least two instruction threads of a multithreaded processor. The four word 32×32 bit addressing configuration 350 may directly map to four 32×32 bit RF blocks allowing a multithreaded processor to treat each RF independently.

Multiple address configurations may be supported on a per instruction basis or per thread basis. For example, even if the multiple independent threads of a multithreaded processor access the four RF blocks 202, 204, 206, and 208 of FIG. 2A individually utilizing address configuration 350, the group of RF blocks could be accessed on a subsequent instruction as a single file according to address configuration 300. A control processor or one of the thread processors acting as a master thread processor may, for example, access the group of four RF blocks utilizing address configuration 300 while the other threads access each RF block individually.

FIG. 4A illustrates exemplary data types 400 which are supported by the SRRF configurations 300, 310, and 320 of FIGS. 3A, 3B and 3C. FIG. 4B illustrates exemplary data type encodings 450 suitable for the exemplary data types 400. For example, the 32 bit data types, shown in column 402 correspond to four bit encodings shown in column 452, respectively. The 64 bit data types shown in column 404 correspond to the four bit encodings shown in column 454, respectively. The data types are indicated in data type encodings 450 as either four byte (4 B), eight byte (8 B), sixteen byte (16 B), dual half word (2H), quad halfword (4H), eight half word (8H), one word (1W), dual word (2 W), quadword (4 W), one doubleword (1 D), two doublewords (2 D), and one quadword (1 Q). To support the four bit data type encodings 450 requires a four bit encoding. The use of the four bit encoding allows the support of a 128 bit data type, shown in columns 406 and 456. The supported 128 bit data types includes, sixteen bytes (16 B) 408, eight halfwords (8H) 410, four words (4 W) 412, dual doublewords (2 D) 414 and a single quadword (1 Q) 416 data type. The data type encodings 450 are shown as a four bit encoding where the three least significant bits b2 b1 b0 are the encodings used for 32 bit 452 and 64 bit 454 data types. With the exception of the 1Q (quadword) 128 bit data type 416 the high order two bits b3 and b2 indicate the operand width of either 32 bit s (00) 452, 64 bit s (01) 454 or 128 bit s (10) 456. The 1Q data type 416 has its own encoding (1111) 458.

Figure 5A:
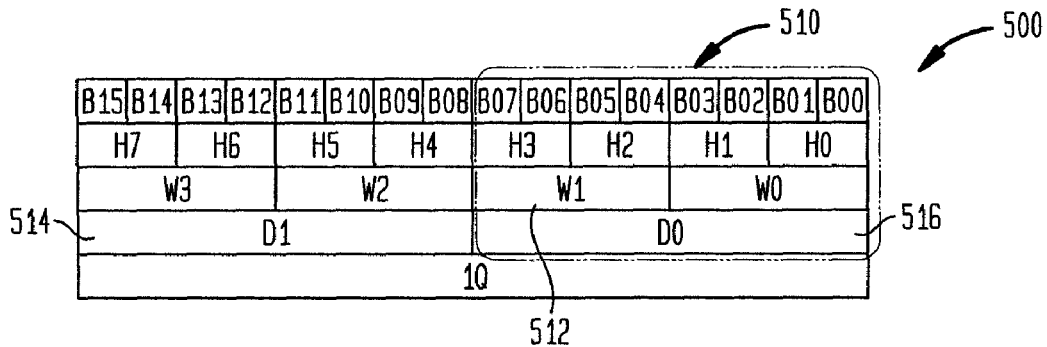
FIG. 5A illustrates the relationship among the data types specified in FIG. 4A, which are stored in the register file in accordance with the present invention.

FIG. 5A illustrates supported data formats 500 showing how data may be stored in an SRRF. A processor architecture utilizes the scalable data formats 500 when accessing data in the SRRF.

Figure 5B:
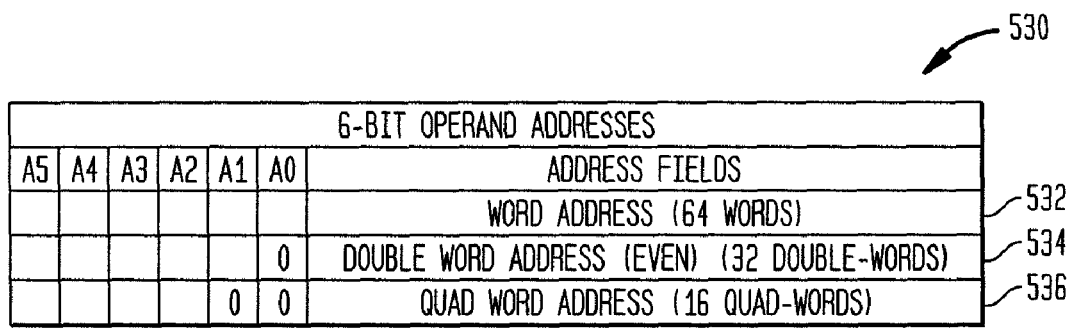
FIG. 5B illustrates a 6 bit register address and indicates whether specific address bits are to be specified as a zero for certain data types and SRRF configurations in accordance with the present invention.
Figure 5C:
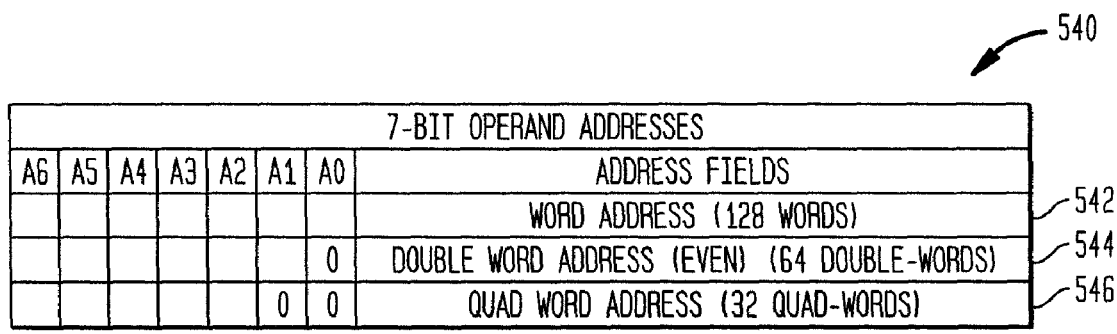
FIG. 5C illustrates a 7 bit register address and indicates whether specific address bits are to be specified as a zero for certain data types and SRRF configurations in accordance with the present invention.

FIG. 5B illustrates instruction operand address bit field definition 530 for 6 bit operand addresses A5-A0. Word addressing 532 uses all six address lines A5-A0, doubleword addressing 534 uses five address lines with A0=0 and quadword addressing 536 uses four address lines with A1=A0=0. FIG. 5C illustrates instruction operand address bit field definition 540 for 7 bit operand addresses A6-A0 for support of an SRRF with 128 32 bit addressable locations. In FIG. 5C, word address 542 uses seven address lines A6-A0, doubleword address 544 uses six address lines A6-A1 with A0=0 and a quadword address 546 uses five address lines A6-A2 with A1=A0=0. This encoding ensures alignment on a word address, a doubleword address and quadword address boundaries as illustrated in FIGS. 3A-3C.

For description purposes, the following syntax is introduced to reference locations utilizing data format 500 of FIG. 5A:

$R^o$ (D0) refers to a doubleword address.

$R^{oo}$ (1 Q) refers to a quadword address.

$R_t^o$ (W1) refers to a 32 bit quantity which is the highest-order word (out of 2 total words) in a referenced doubleword.

$R_t^{oo}$ (W3) refers to a 32 bit quantity which is the highest-order word (out of 4 total words) in a referenced quadword.

$R_t^{oo}$ (D0) refers to a 64 bit quantity which is the lowest-order doubleword (out of 2 total words) in a referenced quadword.

Therefore, just as it is required that a doubleword address ($R^o$) contains a zero in the LSB position, due to the register file configuration and associated operand addressing, it is also required that a quadword address ($R^{00}$) contains zeroes in the 2 LSB positions. For example, with 7 bit operand addressing utilizing word addressing configuration 300 and an SRRF such as FIG. 2A, to address location R5 302 the address value of R5 (0000101) would be used directly. To address location R5 utilizing doubleword addressing configuration 310, it would be necessary to specify $R_4^0$(W1) (0000100) which is the high order word (W1) of the addressed doubleword 312, as also shown in FIG. 5A as word W1 512. Doubleword addressing 310 is shown in FIG. 3B which requires only 6 address bits to cover the 64 addressable doubleword locations. Therefore, in row 542, A0 equals 0 in a 7 bit address, effectively counting by 2 or equivalently, addressing by the even addresses. To address location R5 in quadword addressing configuration 320, it would be necessary to specify $R_4^{00}$ (W1) (0000100) which is the second word (W1) of a quadword group (W3, W2, W1, W0) of the addressed quadword 322. For quadword addressing in this case requires only 5 address bits to cover the 32 addressable quadword locations therefore A1=A0=0 in a 7 bit address, effectively addressing by counting by 4.

FIG. 5D illustrates an exemplary table of three instruction formats 550 that take advantage of the SRRF and are appropriate for the instruction architecture of the present invention. Each format is represented by a row in format table 550. The formats in table 550 have up to three operand fields 552, 554, and 556 where each operand field in each format may hold up to a 7 bit address for an operand range of 128 locations. Each format also includes a 4 bit type field 558 which contains the associated data type. As an alternative, FIG. 5E illustrates an exemplary table of three instruction formats 570 for use in a lower capacity SRRF composed of four 16×32 bit building block RFs. The formats in table 570 have up to three operand fields 572, 574, and 576 where each operand field may hold up to a 6 bit address for an operand address range of 64 locations. The supported data types of 32 bit, 64 bit and 128 bit remain the same and are encoded with the 4 bit type field 578 as shown in data type encodings 450.

Figure 6A:
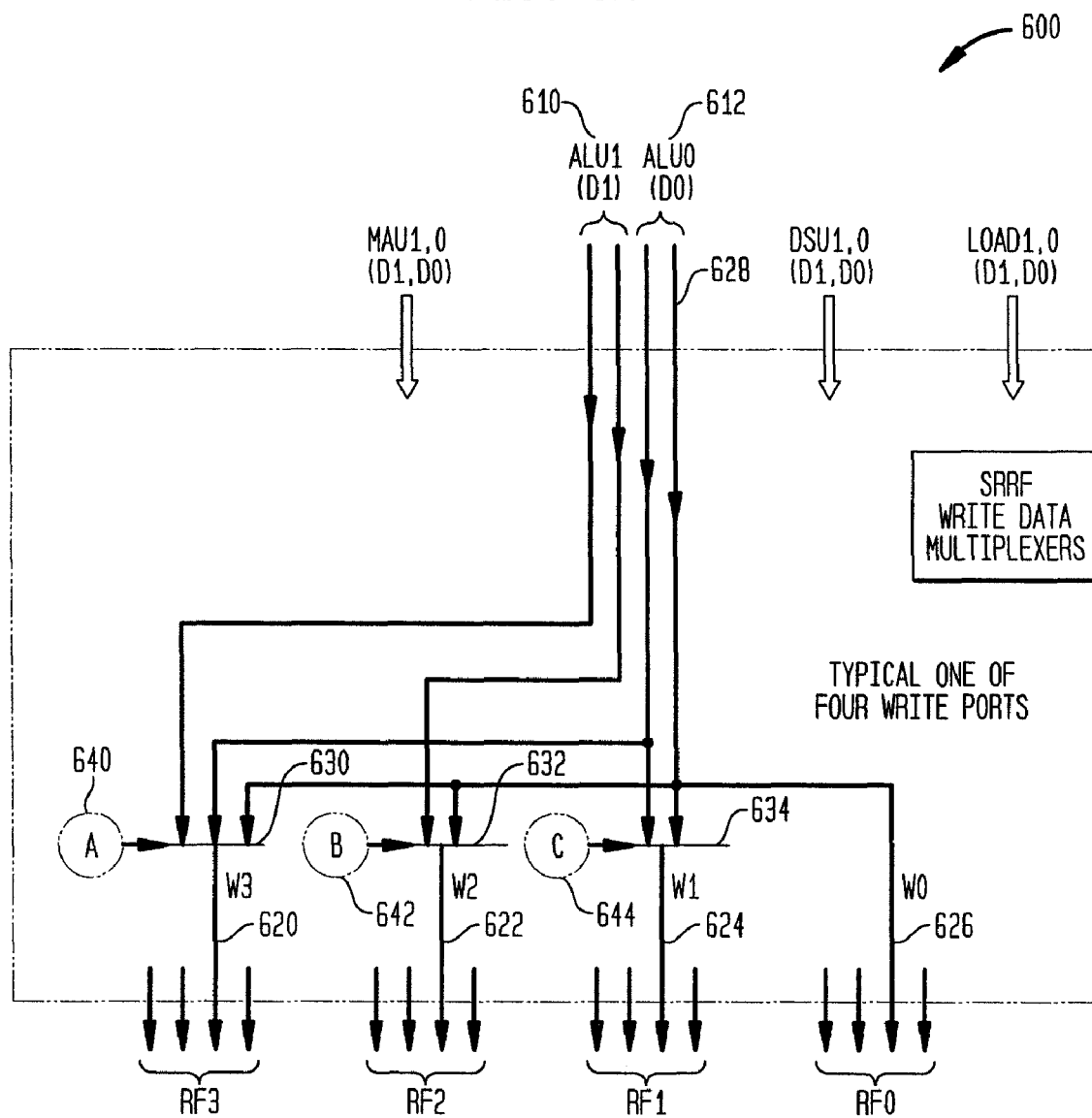
FIG. 6A illustrates an example of typical one of four write data port multiplexers for use in a system using the SRRF of FIG. 2A in accordance with the present invention.

FIG. 6A illustrates an example of SRRF write data multiplexers circuitry 600 suitable for use in one of each of the four write ports per RF shown in FIG. 2A. The SRRF write data multiplexer circuitry 600 supports address configurations 300, 310, and 320. The SRRF write data multiplexer circuitry 600 may be sourced by ALU execution units to write results into a suitable SRRF such as SRRF 209. Referring to data formats 500 in FIG. 5A, the SRRF write data multiplexer circuitry 600, in general, is responsible for aligning doubleword sized operands to upper (W3 and W2) and lower (W1 and W0) word positions in the 128 bit configuration of the SRRF and quadword operands to W3, W2, W1 and W0 positions. The SRRF's 128 bits of ALU port write data consisting of the upper 64 bits from ALU1 610 are concatenated with the lower 64 bits from ALU0 612. They are also aligned so that the ALU0 data may be written into either the upper doubleword of the SRRF (W3 620 and W2 622), or the lower doubleword of the SRRF (W1 624 and W0 626). ALU1 data 610 may be written into the upper doubleword of the SRRF (W3 620 and W2 622).

It is noted that a 32 bit result from ALU0 628, half the doubleword path available from ALU0, may be written into any word position (W3, W2, W1 or W0) of the SRRF with the SRRF write accessing the SRRF utilizing address configuration 320. Also, a quadword would be written to all four word write ports W3, W2, W1 and W0. Therefore, for doubleword and smaller result operands, the execution unit sourcing the lower doubleword or word operand, for example, ALU0 612, has write access capability to the entire SRRF space, when dynamically configured as either a 128×32 or a 64×64 dimensioned SRRF. The execution unit sourcing the upper doubleword operand, for example ALU1, is used for writing a result to the SRRF space when dynamically configured as a 32×128 dimensioned SRRF. Word multiplexers 630, 632 and 634 select the appropriate ALU result data path according to select signals A 640, B 642 and C 644, respectively. These select signals 640, 642 and 644, and similar select signals for each SRRF access port, are generated based upon an executing instruction's opcode, operand address fields, and the data type.

Figure 6B:
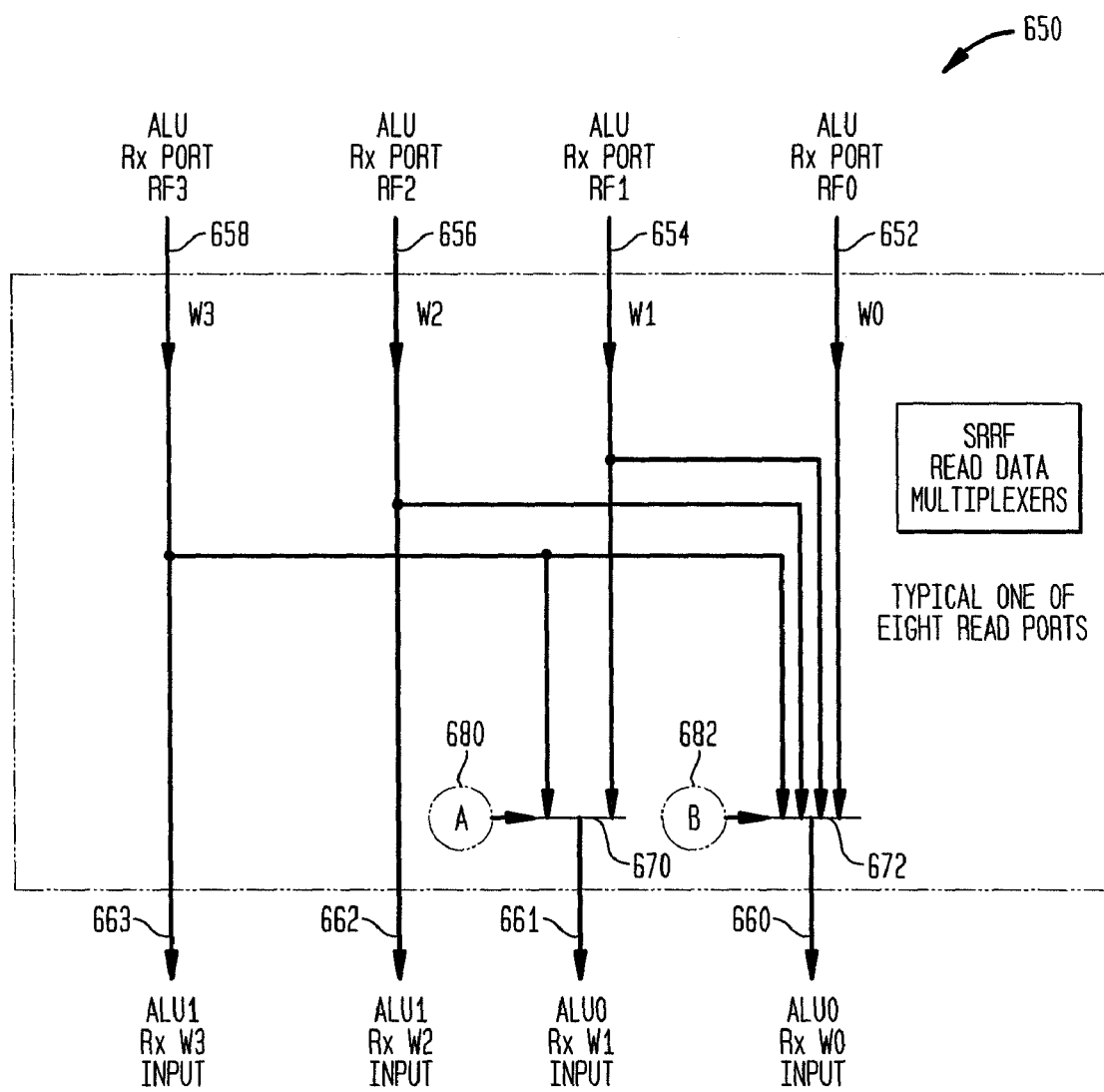
FIG. 6B illustrates an example of a typical one of eight read port multiplexers for use in a system using the SRRF of FIG. 2A in accordance with the present invention.

FIG. 6B illustrates an example of SRRF read data multiplexer circuitry 650, suitable for use in one of the read ports per RF of the type shown in FIG. 2A and suitable for address configurations 300, 310 and 320. The SRRF read data multiplexer circuitry 650 are used by ALU execution units to read operands from a suitable SRRF, such as SRRF 209. The SRRF read data multiplexer circuitry 650 is responsible for aligning word operands, such as Rx operands 652, 654, 656, and 658 to an ALU0 word input, such as ALU0 Rx W0 input 660. The SRRF read data multiplexer circuitry 650 is further responsible for aligning doubleword sized source operands, such as the two Rx word pairs W1∥W0, 654 and 652, respectively, and the two Rx word pairs W3∥W2, 658 and 656, respectively, to ALU0 doubleword input which is a concatenation of ALU0 Rx W1 input 661 with ALU0 Rx W0 660. The SRRF read data multiplexer circuitry 650 also provides quadword operands to both ALU1 and ALU0, with ALU1 Rx W3 input 663∥ALU1 Rx W2 input 662 and with ALU0 Rx W1 input 661∥ALU0 Rx W0 input 660.

It is noted that for ease of illustration, only one of eight read ports per RF is shown in FIG. 6B. Specifically, a word operand sourced from any one of the four RF blocks, RF3-W3 658, RF2-W2 656, RF1-W1 654, or RF0-W0 652 is aligned to ALU0 Rx-W0 input 660. A doubleword operand is read from RF1∥RF0 or RF3∥RF2 and aligned such that either the upper SRRF W3 658 and W2 656 doubleword operand, or lower SRRF W1 654 and W0 652 doubleword operand may be read into ALU0's 64 bit operand W1 661∥W0 660 input port. ALU0's 64 bits of SRRF port read data W3∥W2 is aligned, by definition for the chosen configurations, such that it receives the upper SRRF W3 658 and W2 656 doubleword operand into its operand input port. Therefore, for doubleword and smaller source operands ALU0 has read access capability to the entire SRRF space, when dynamically configured as either 128×32 configuration 300 or 64×64 configuration 310. The other execution unit, ALU1, can read upper doubleword operands, from RF3 and RF2, while configured as 32×128 configuration 320. Word multiplexers 670 and 672 select the appropriate RF word data path according to select signals A 680 and B 682. These select signals 680 and 682 and similar select signals for each execution unit input port, are generated based upon an executing instruction's opcode, operand address field, and the data type.

Extended Precision

With use of larger scalable reconfigurable register files, such as the SRRF 232 shown in FIG. 2B, with M=16 and N=32, greater levels of parallel operations, such as dual word multiply accumulate and quad halfword multiply accumulate, can be obtained. Along with this capability, the extended precision concept can be applied to each individual operation requiring extended precision. For example, FIG. 7A illustrates a multiply with extended accumulate instruction (MPYXA) 700 as loaded in a VIM slot. The MPYXA instruction 700 has three operand address fields 704, 706 and 708 for greater addressing range. The MPYXA instruction 700 also has a four bit data type field MPack 710 to specify the additional packed data parallel operations which are defined in the 2W and 4H syntax/operation table 750 of FIG. 7B. It is noted that the dual 32 bit (2W) multiply-accumulate instruction syntax/operation 754 uses two configurations of the SRRF in the execution of a single instruction. For MPack field 710 set to the 2W syntax/operation 754, the dual 32 bit×32 bit products of dual word source registers Rx and Ry are added to two extended precision target registers. Field 704 specifies both the two extended precision target registers and the two 16 bit extended precision registers. In other words, in the dual word form of the instruction, two 32 bit×32 bit multiplies are performed producing two 64 bit results which are then added to two 80 bit extended precision target registers. For MPack=4H 764, the quad halfword form of the instruction, four 16 bit×16 bit multiplies are performed producing four 32 bit results (4W) which are then added to four 40 bit extended precision target registers. The extended precision bits are provided by the doubleword extended precision register (XPR) 800 of FIG. 8A which will be described in further detail below.

Returning to the syntax/operation table 750, the 2W operation performed by this instruction is:

$$XPR.Hb\|Rt^{oo}.D1 \leftarrow XPR.Hb\|Rt^{oo}.D1 + Rxe^o.W1 * Rye^o.W1 \qquad \text{Equation 1}$$

$$XPR.Ha\|Rt^{oo}.D0 \leftarrow XPR.Ha\|Rt^{oo}.D0 + Rxe^o.W0 * Rye^o.W0 \qquad \text{Equation 2}$$

where $Rxe^o$ and $Rye^o$ both specify doubleword address configuration 715 where the Equation 1 multiply accumulate operation specifies the second word position W1 at the addresses $Rxe^o$ and $Rye^o$, respectively, to be multiplied together. The result is then added to $XPR.Hb\|Rt^{oo}.D1$ in which $Rt^{oo}.D1$ specifies a quadword address configuration 720 and selects the second doubleword position (D1) 514 at the $Rt^{oo}$ address. Address configuration 715 is used for the source operands. Address configuration 720 is used for the target operand in the same operation cycle for the instruction. The MPYXA instruction 700 exemplifies how different addressing configurations are utilized when executing one instruction.

In a similar manner, the Equation 2 multiply accumulate operation specifies the first word position W0 at addresses $Rxe^o$ and at $Rye^o$, address configuration 715, to be multiplied together. The result is added to $XPR.Ha\|Rt^{oo}.D0$ in which $Rt^{oo}.D0$ specifies a quadword address, configuration 720, and selects the first doubleword position (D0) 516 at the $Rt^{oo}$ address. Both these 32 bit*32 bit+(16||64) bit operations produce results in the same execute cycle for the instruction producing two 16 bit extended precision results and two 64 bit results. The two 64 bit results use a 128 bit bus and write port to write the data back into the SRRF. In a traditional nonsplit 32 bit wide register file, it would take one (Rx)+one (Ry)+two (Rt)=four 32 bit read ports and two (Rt) 32 bit write ports to satisfy individually Equation 1 and Equation 2. To execute both Equation 1 and 2 simultaneously as specified by this instruction using conventional techniques, a total of twelve ports are required. With an SRRF 232 as illustrated in FIG. 2B, with M=16 and N=32, it would take one 64 bit Rx port, for the two 32 bit Rx values, one 64 bit Ry port, for the two 32 bit Ry values, one 128 bit Rt port, for the two 64 bit Rt values, and one Rt port, for the 128 bit write Rt values for a total of four ports. The extended precision values, as will be described in further detail below, are supplied externally from the register file building blocks. As demonstrated by the above example, the present invention advantageously supplies different levels of data precision while utilizing the reconfiguration capabilities of the SRRF.

FIG. 8A illustrates doubleword extended precision register XPR 800. The extended precision register XPR 800 may contain halfwords XPR.H0 804, XPR.H1 806, XPR.H2 808 and XPR.H3 810, or bytes XPR.B0 820, XPR.B1 822, XPR.B2 824, XPR.B3 826, XPR.B4 828, XPR.B5 830, XPR.B6 832, and XPR.B7 834.

FIG. 8B illustrates two quad halfword (4H) register usage tables 840. The 4H register usage tables 840 illustrate how the XPR bytes are associated with word target registers in SRRF for 4H operations. It is noted that 4H operations refer to quad halfword packed data forms of instruction operation, such as the 4H operation 764, where extended precision byte registers are used. The instruction MPYXA 700 can be specified by the opcode 702 and MPack 710 to operate as four separate operations 764 producing four 40 bit results. Each separate 40 bit result is made up of a 32 bit word from the SRRF, as specified by $Rt^{oo}.W0$, $Rt^{oo}.W1$, $Rt^{oo}.W2$, and $Rt^{oo}.W3$, that is associated with an XPR byte as shown in FIG. 8B. For example, the first group of four halfword operations 842 are used if the target register in SRRF $Rt^{oo}$ is specified as one of the set of registers {0, 8, 16, 24, 32, 40, 48, 56} where, as can be seen from the instruction operation 764, four word results W0, W1, W2, and W3 are extended by XPR bytes Ba, Bb, Bc, and Bd, respectively.

Since four word results in packed data format account for 128 bit s, the target register is specified as $Rt^{oo}$ and target operand address Rt uses only bits 21-24 of the MPYXA instruction with two LSBs set to 00, $Rt^{oo}$ bit field 704. Consequently, XPR bytes B0-B3 are associated with the $Rt^{oo}$ specified group of four target registers. For example, an $Rt^{oo}$ of 0 specifies 4 packed works as follows. The first word can be referenced as $Rt^{oo}.W0\{0\}$ which refers to the 32 bit word R0 724 and is associated with XPR.B0 844. The second word can be referenced as $Rt^{oo}.W1\{1\}$ which refers to the 32 bit word R1 726 and is associated with XPR.B1 846. The third word can be referenced as $Rt^{oo}.W2\{2\}$ which refers to the 32 bit word R2 728 and is associated with XPR.B2 848. The fourth word can be referenced as $Rt^{oo}.W3\{3\}$ which refers to the 32 bit word R3 730 and is associated with XPR.B3 850.

The second group of four halfword operations 852 are used if the target register $Rt^{oo}$ is specified as one of the set of registers {4, 12, 20, 28, 36, 44, 52, 60} where, as can be seen from the instruction operation 764, four word results W0, W1, W2, and W3 are extended by XPR bytes Ba, Bb, Bc, and Bd, respectively. The bytes associated with the four words results depend upon the target register address. As with the previous group of halfword operations 842, the two LSBs of the $Rt^{oo}$ address are set to 00. Consequently, XPR bytes B4-B7 are associated with the $Rt^{oo}$ specified group of four target registers. For example, an $Rt^{oo}$ of 4 specifies 4 packed words as follows. The first word can be referenced as $Rt^{oo}.W0\{4\}$ which refers to the 32 bit word R4 734 and is associated with XPR.B4 854. The second word can be referenced as $Rt^{oo}.W1\{5\}$ which refers to the 32 bit word R5 736 and is associated with XPR.B5 856. The third word can be referenced as $Rt^{oo}.W2\{6\}$ which refers to the 32 bit word R6 738 and is associated with XPR.B6 858. The fourth word can be referenced as $Rt^{oo}.W3\{7\}$ which refers to the 32 bit word R7 740 and is associated with XPR.B7 860.

FIG. 8C illustrates two dual word (2W) register usage tables 870. The 2W register usage tables 870 illustrate how XPR halfwords are associated with doubleword target registers for 2W operations. For example, a first group of two word operations 872 are used if the target register $Rt^{oo}$ is specified as one of the set of registers {0, 8, 16, 24, 32, 40, 48, 56} where, as can be seen from the instruction operation 754, two doubleword results D0 and D1 are extended by XPR halfwords Ha and Hb, respectively. The halfwords associated with the two doubleword results depend upon the target register address. Since two doubleword results account for 128 bits, the target register is specified as $Rt^{oo}$ and target operand address Rt uses only bits 21-24 of the MPYXA instruction with two LSBs set to 00, $Rt^{oo}$ bit field 704. Consequently, XPR halfwords H0 and H1 are associated with the specified target doublewords listed as word pairs. In a similar fashion, a second group of two word operations 882 are used if the target register $Rt^{oo}$ is specified as one of the set of registers {4, 12, 20, 28, 36, 44, 52, 60}. Consequently, XPR halfwords H2 and H3 are associated with the specified target doublewords listed as word pairs.

FIG. 9A illustrates a halfword XPR system 900 where the MPYXA.2W operation uses two XPR halfwords in support of the two doubleword operations and where the selection of the two halfwords is through use of the target register operand address bit A2, which is bit 21 of the $Rt^{oo}$ bit field 704. The instruction specifies extended precision operations to support different data types, such as extending the precision of the results of two 32×32 multiplies, 904 and 908, as described above for MPYXA operation 754. In order to extend the precision of two 32×32 multiply accumulate operations, two XPR halfword registers, 914 and 918, are used. For this 2W MPYXA operation, bit 21 of a pipeline stage $Rt^{oo}$ address, corresponding to the $Rt^{oo}$ address field 704, is illustrated as the A2 bit of FIG. 5B. Likewise, bits 24-22 and bits 20-19 correspond to bits A5-A3 and bits A1-A0 of FIG. 5B, respectively. After the pipeline stage register, bit 21 of the $Rt^{oo}$ address field 704 becomes the Rt operand address bit A2 920. The A2 bit 920 is used to select two halfword XPRs, either XH0 and XH1 914 or XH2 and XH3 918, through multiplexers 921 and 922, respectively. It is noted that two 80 bit results 924∥926 and 930∥932 are computed in the 2W MPYXA operation 900, where the two extended precision accumulation bits, bits 64-79 of each 80 bit result are stored back on outputs 924 and 930 into the selected XPR halfword registers 914 or 918 while the two 64 bit portions of the two 80 bit results, bits 0-63 are stored back on outputs 926 and 932 into the SRRF at the 128 bit target register specified by $Rt^{oo}$.

FIG. 9B illustrates a byte XPR system 950 where the MPYXA.4H operation uses four XPR bytes in support of the four word operations and where the selection of the four bytes is through use of the target register operand address bit A2, which is bit 21 of the $Rt^{oo}$ bit field 704. This instruction specifies extended precision operations to support different data types, such as extending the precision of the results of four 16×16 multiples, 954, 956, 958, and 960, as described above for MPYXA operation 764. In order to extend the precision of four 16×16 multiply accumulate operations, two XPR registers containing four XPR bytes, 964 and 968, are used. For this 4H MPYXA operation, bit 21 of a pipeline stage $Rt^{oo}$ address, corresponding to the $Rt^{oo}$ address field 704, is illustrated as the A2 bit of FIG. 5B and becomes the Rt operand address bit A1 970. Likewise, bits 24-22 and bits 20-19 correspond to bits A5-A3 and bits A1-A0 of FIG. 5B, respectively. The A2 bit 970 is used to select four bytes, XPRs, either XB0, XB1, XB2, and XB3 964 or XB4, XB5, XB6, and XB7 968 through multiplexers 972, 973, 974, and 975. It is noted that four 40 bit results 976∥974, 980∥978, 984∥982 and 988∥986 are computed in the 4H MPYXA operation 950, where the four extended precision accumulation bits 976, 980, 984 and 988, of each 40 bit result are stored into the selected XPR byte registers, either XPR byte register 964 or XPR byte register 968 while four 32 bit portions 974, 978, 982 and 986 of the 40 bit results are stored into the SRRF at the 128 bit target register specified by $Rt^{oo}$.

The extended precision concept can be further extended to support quad 20 bit accumulations for 16 bit data types using 4 extended precision bits. The concept may be further generalized by using more than one extended precision register and basing the selection of the register extended precision portions on more than a single LSB of the instruction Rte field. With the extended precision concepts illustrated herein, support for four 80 bit extended precision accumulate operations and eight 40 bit extended precision accumulate operations can be achieved with various size scalable reconfigurable register files.

While the present invention has been described in the context of a number of presently preferred embodiments, it will be recognized that the teachings of the present invention may be advantageously applied to a variety of processing arrays and variously adapted consistent with the claims which follow.

We claim:

1. An apparatus comprising:
two register files, each register file operable to hold a plurality of entries of a first bit width;
three execution units, each execution unit configurable to operate on an entry of the first bit width and two of the three execution units configurable to operate as a combined execution unit on an entry of a second bit width, wherein the second bit width is greater than the first bit width; and
a control unit receiving a first instruction and a second instruction for parallel execution, wherein the control unit in response to the first instruction accesses one entry from the plurality of entries at one at the two register files to be operated on by one of the three execution units as a first input value, and wherein the control unit in response to the second instruction accesses two entries, one from each of the two register files, and wherein the control unit combines the two entries into a second input value of the second bit width to be operated on by the combined execution unit.

2. The apparatus of claim 1 further comprising:
two additional register files for a total of four register files, each additional register file operable to hold a plurality of entries of the first bit width; and
four additional execution units for a total of seven execution units, each additional execution unit configurable to operate on input values of the first bit width and at least four of the seven execution units configurable to operate as a second combined execution unit on an input value of a third bit width, wherein the third bit width is greater than the second bit width, wherein the control unit receives the first instruction, the second instruction, and a third instruction for parallel execution, and wherein the control unit in response to the third instruction accesses four entries, one from each of the four register files, and wherein the control unit combines the four entries into a third input value of the third bit width to be operated on by the second combined execution unit.

3. The apparatus of claim 1, wherein the two register files are operable to store a first result received from the one of the three execution units in one of the two register files and to store a second result received from the combined execution unit in the two register files, wherein the second result is partitioned into two sub-results, and wherein each of the two sub-results are stored in a different register file.

4. The apparatus of claim 2, wherein the four register files are operable to store a third result received from the second combined execution unit in the four register files, wherein the third result is partitioned into four sub-results, and wherein each of the four sub-results are stored in a different register file.

5. The apparatus of claim 1 further comprising:
extended precision registers holding a plurality of extended precision entries of a first extension bit width, wherein the first input value is combined with the first extension bit width to create an extended precision first entry.

6. The apparatus of claim 5, wherein the extended precision registers store extended precision results from execution on the extended precision first entry.

7. The apparatus of claim 1, wherein the first instruction is configured with a first data type field to identify the first bit width and the second instruction is configured with a second data type field to identify the second bit width.

8. The apparatus of claim 1, wherein the control unit in response to the first instruction configures the addressability of the two register files for word addressing.

9. The apparatus of claim 1, wherein the control unit in response to the second instruction configures the addressability of the two register files for double word addressing.

10. The apparatus of claim 2, wherein the control unit in response to the third instruction configures the addressability of the four register files for quad word addressing.

11. An apparatus comprising:
two register files, each register file configurable with a first read port and a second read port and operable to hold a plurality of entries of a first bit width;
three execution units, each execution unit configurable to operate on an entry of the first bit width and two of the three execution units configurable to operate as a combined execution unit on an entry of a second bit width, wherein the second bit width has twice as many bits as the first bit width; and
a control unit receiving a first instruction and a second instruction for parallel execution, wherein the control unit in response to the first instruction configures the addressability of the two register files to access one entry from the plurality of entries at one of the two register files to be operated on by one of the three execution units as a first input value, and wherein the control unit in response to the second instruction configures the addressability of the two register files to access two entries, one from a second read port of each of the two register files, and wherein the control unit combines the two entries into a second input value of the second bit width to be operated on by the combined execution unit.

12. The apparatus of claim 11 further comprising:
two additional register files for a total of four register files, each additional register file configurable with a first read port, a second read port, a third read port, and operable to hold a plurality of entries of the first bit width, wherein the two register files are further configurable with a third read port; and
four additional execution units for a total of seven execution units, each additional execution unit configurable to operate on input values of the first bit width and at least four of the seven execution units configurable to operate as a second combined execution unit on an input value of a third bit width, wherein the third bit width has four times as many bits as the first bit width, wherein the control unit receives the first instruction, the second instruction, and a third instruction for parallel execution, and wherein the control unit in response to the third instruction configures the addressability of the four register files to access a first bit width value from a third read port of each of the four register files and combines the first bit width values into a third input value of the third bit width to be operated on by the second combined execution unit.

13. The apparatus of claim 11, wherein the two register files are configured with a first write port and a second write port, operable to store a first result from the one of the three execution units received at the first write port of one of the two register files, and operable to store a second result from the combined execution unit in the two register files, wherein the second result is partitioned into two sub-results, and wherein each of the two sub-results are received at the second write port and stored in a different register file.

14. The apparatus of claim 12, wherein the four register files are configured with a third write port and operable to store a third result received from the second combined execution unit in the four register files, wherein the third result is partitioned into four sub-results, and wherein each of the four sub-results are received at the third write port and stored in a different register file.

15. The apparatus of claim 11, wherein the first instruction is configured with a first data type field to identify the first bit width and the second instruction is configured with a second data type field to identify the second bit width.

16. The apparatus of claim 11, wherein the first instruction comprises a first data type field and a first source register address field for aligning on a first address boundary specified by the first data type field, and wherein the second instruction comprises a second data type field and a second source register address field for aligning on a second address boundary specified by the second data type field.

17. A method comprising:
receiving a first instruction and a second instruction for parallel execution;
accessing an entry of a first bit width from one of two register files as a first input value in response to the first instruction;
accessing two entries in response to the second instruction, one from each of the two register files, wherein each entry of the two entries is of the first bit width, wherein the two entries are combined to form a second input value of a second bit width;
operating on the first input value by one of three execution units configured for execution in response to the first instruction; and
operating on the second input value by two of the three execution units configured to operate as a combined execution unit for execution in response to the second instruction and in parallel with operating on the first input value.

18. The method of claim 17 further comprising:
receiving a third instruction together with the first instruction and the second instruction for parallel execution;

accessing four entries, one from each of the two register files and one from each of two additional register files, wherein each of the four entries is of a first bit width, wherein the four entries are combined to form a third input value of a third bit width in response to the third instruction; and operating on the third input value by four of seven execution units configured to operate as a second combined execution unit in response to the third instruction and in parallel with operating on the first input value and operating on the second input.

19. The method of claim 17 further comprising:

storing a first result received from the one of three execution units in one of the two register files; and storing a second result received from the combined execution unit in the two register files, wherein the second result is partitioned into two sub-results, and wherein each of the two sub-results are stored in a different register file.

20. The method of claim 18 further comprising:

storing a result partitioned into fur sub-results received from the second combined execution unit in the two register files and the two additional register files, wherein each of the four sub-results are stored in a different register file.

* * * * *